United States Patent

[11] 3,599,813

[72] Inventor Clayton J. Totz
  Geneva, Ill.
[21] Appl. No. 27,902
[22] Filed Apr. 13, 1970
[45] Patented Aug. 17, 1971
[73] Assignee Caterpillar Tractor Co.
  Peoria, Ill.

[54] ROLLOVER SAFETY STRUCTURE FOR ARTICULATED LOADERS
  6 Claims, 3 Drawing Figs.
[52] U.S. Cl. ................................... 214/140, 280/150 C
[51] Int. Cl. .................................... B66f 9/00
[50] Field of Search ......................... 214/140, 131; 280/150 C; 296/102

[56] References Cited
UNITED STATES PATENTS
2,732,963  1/1956  Grubich ............... 280/150 C X
3,443,833  5/1969  Miller et al. ............... 296/102

Primary Examiner—Gerald M. Forlenza
Assistant Examiner—John Mannix
Attorney—Fryer, Tjensvold, Feix, Phillips & Lempio ABSTRACT: In an articulated loader vehicle having a rear frame carrying the engine and operator's station and having a front frame with spaced upright towers supporting lift arms and a bucket and having means for pivoting one frame relative to the other for steering purposes, rollover protection for the operator is provided by a post extending upwardly from each loader tower to a rectangular top member which is cantilevered back over the operator's station. This disposition of the rollover structure on the front frame towers maximizes strength without interfering with other loader components and avoids interference with the operator's view of the direction of travel of the vehicle and the bucket during turning.

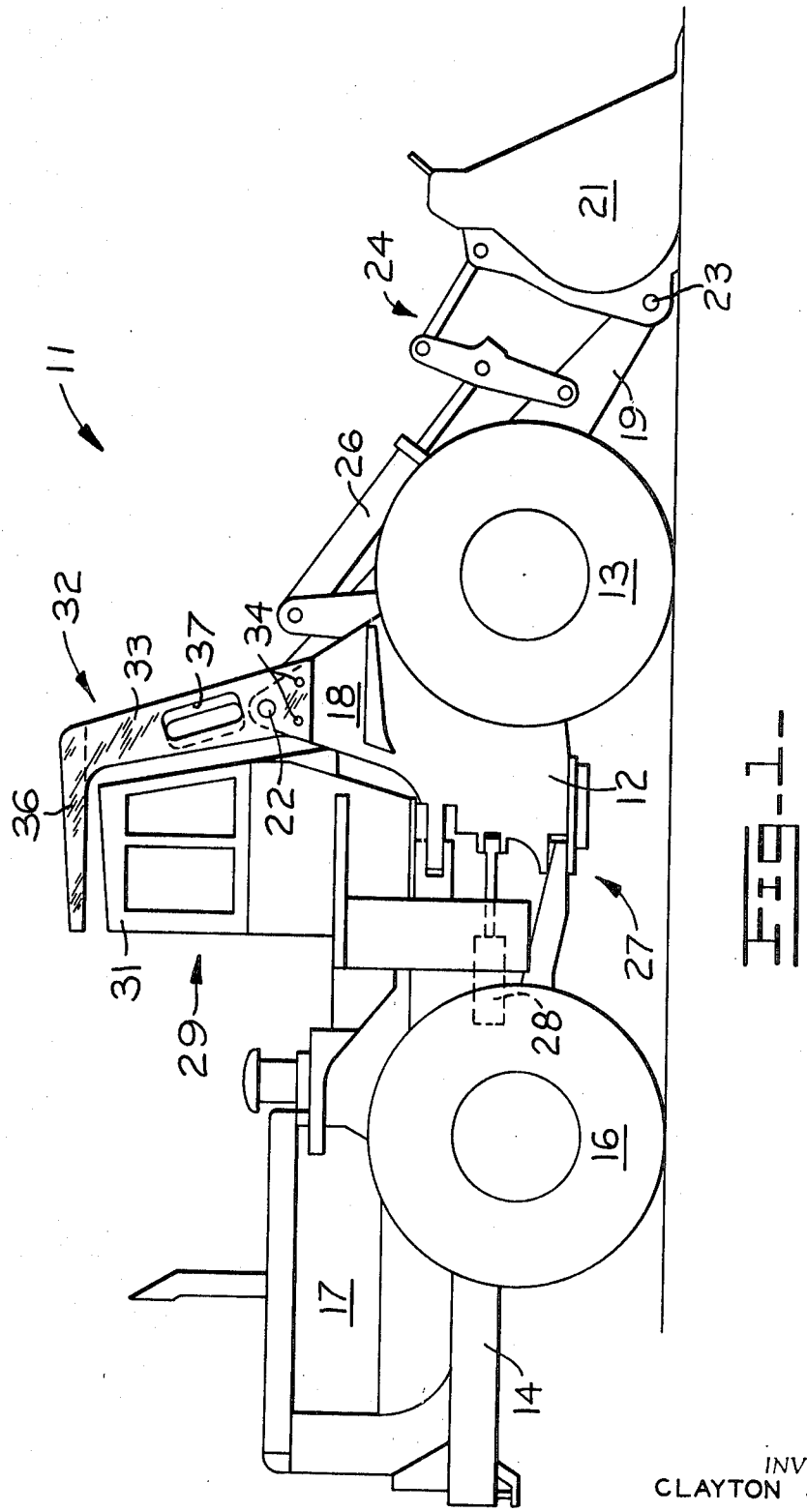

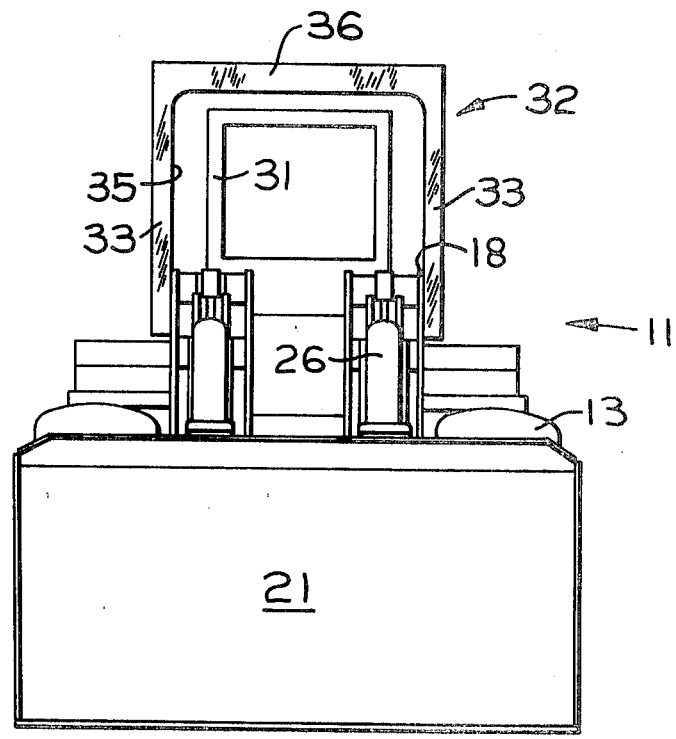

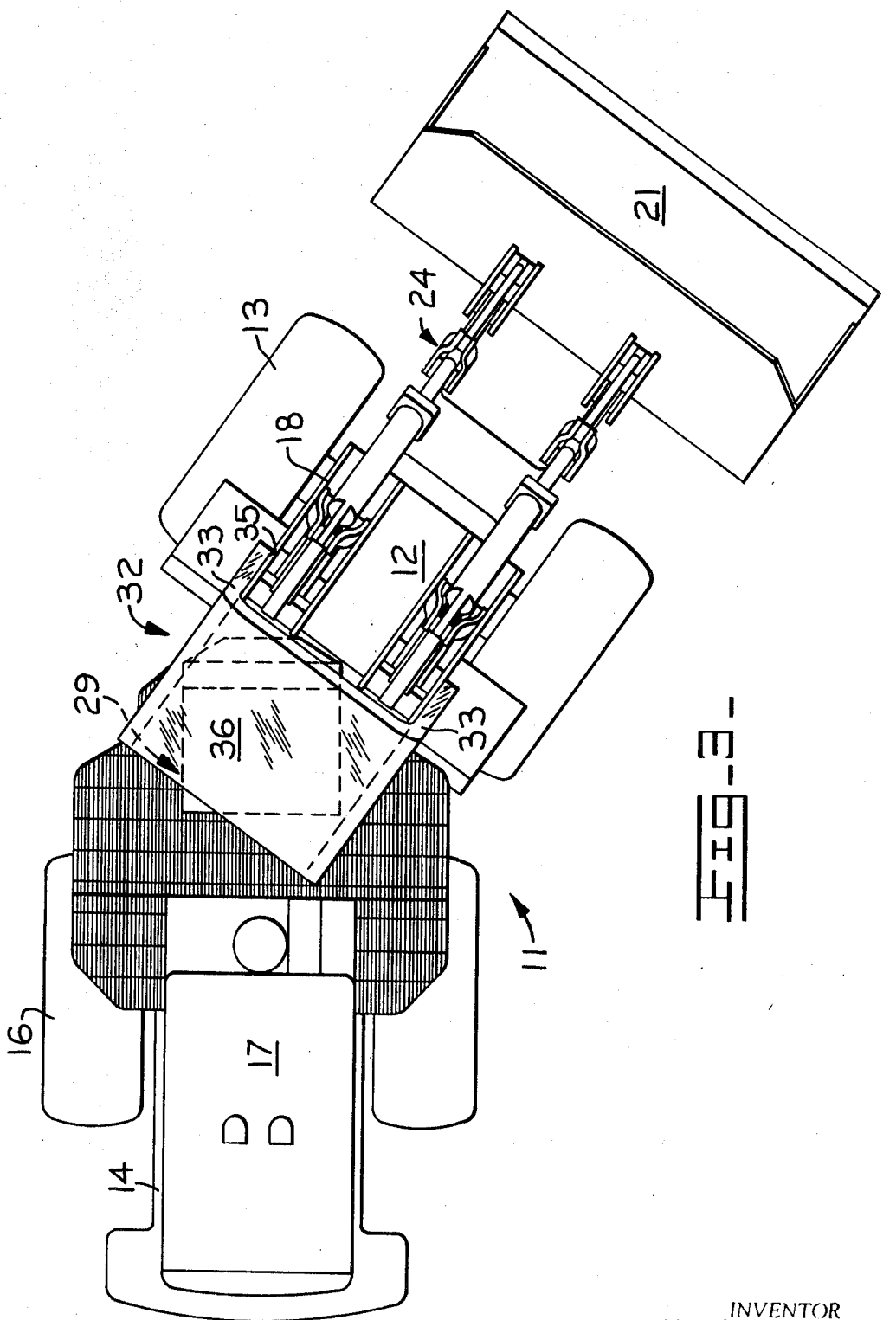

3,599,813

ROLLOVER SAFETY STRUCTURE FOR ARTICULATED LOADERS

BACKGROUND OF THE INVENTION

This invention relates to articulated loader vehicles and the like and more particularly to rollover protective structure for safeguarding an operator in the event such a vehicle overturns.

It is widely recognized that powered vehicles which are operated under certain potentially hazardous conditions should be provided with protective structure which extends over the operator and is of sufficient strength to support the weight of the vehicle in the event the vehicle overturns. This cannot be readily accomplished on certain vehicles without major modifications or interference with the operation of other components. If the protective structure interferes with the operator's view of the worksite or the path of travel of the vehicle, the structure may itself introduce safety hazards.

Articulated loaders are a class of vehicle in which the above discussed problems are encountered. Such loaders have front and rear frames each riding on a single pair of wheels and joined by means which provides for pivoting of one frame relative to the other about a vertical axis for steering purposes. In many loader designs, both the engine and the operator's compartment are situated on the back frame while a pair of upwardly extending spaced-apart towers on the front frame support lift arms which carry the loader bucket.

In providing rollover protection for these loaders it has heretofore been the practice to secure the protective structural members to the rear frame. Difficulties and complications have resulted in that many loader designs do not offer anchoring points in the vicinity of the operator's station which are of sufficient structural strength to assure safety and which can be utilized without interfering with other components of the vehicle. To provide adequate support, it has been necessary to use undesirably complex protective members or to extend such members to points on the rear frame which are remote from the operator's station. If the protective members extend towards the front of the operator's station, a further difficulty is encountered. In particular, articulation of the loader in the course of turning causes the forward frame to pivot away from a longitudinal axis through the rear frame. At this time, forwardly situated protective members may partially obscure the operator's view of the direction of travel of the vehicle and of the bucket. This is highly undesirable both from the safety standpoint and with respect to working efficiency.

SUMMARY OF THE INVENTION

This invention is a compact, high strength rollover protective structure for articulated loader vehicles which is adaptable to most loader designs and which maintains the operator's normal view of the loader bucket and the direction of travel of the vehicle during turning. Rollover protective members are secured to the front frame of the loader and the top of the structure is cantilevered back over the operator's station on the rear frame. In particular, the protective structure is anchored to high strength elements of the front frame which were designed to sustain the heavy load forces on the bucket. The protective structure turns with the front frame during turning of the vehicle and thus does not interfere with the operator's view of the line of travel at such times.

Accordingly, it is an object of this invention to provide compact, high strength rollover protection means for the operator of an articulated loader which is adaptable to a variety of loader designs and which does not impair visibility of critical areas during turning.

The invention, together with further objects and advantages thereof, will best be understood by reference to the following description of a preferred embodiment in conjunction with the accompanying drawings.

BRIEF DESCRIPTION OF THE DRAWINGS

In the accompanying drawings:

FIG. 1 is a side elevation view of an articulated loader vehicle having rollover safety structure in accordance with the invention, FIG. 2 is a front elevation view of the loader of FIG. 1, and FIG. 3 is a plan view of the loader vehicle of FIG. 1 with the front frame pivoted relative to the rear frame to turn the vehicle.

DESCRIPTION OF A PREFERRED EMBODIMENT

Referring now to FIGS. 1 and 2 of the drawings in conjunction, an articulated loader 11 typical of the type to which the invention is applicable has a front frame 12 riding on a single pair of front wheels 13 and a rear frame 14 riding on an additional pair of wheels 16. The driving engine 17 is carried on the back portion of rear frame 14 while front frame 12 includes a pair of high strength loader towers 18 which extend upwardly at each side of the vehicle.

A pair of lift arms 19 extend forward from the upper end of towers 18 at each side of the vehicle to support the bucket 21. The back ends of arms 19 are coupled to the towers 18 through pivot axles 22 whereby the arms may be raised and lowered to manipulate bucket 21 in the manner known to the art. Bucket 21 is coupled to the forward end of the lift arms 19 at pivot joints 23 and conventional tilt linkage 24 is connected between the bucket and lift arms to maintain the bucket in a substantially constant inclination as the arms are raised and lowered. The tilt linkage includes hydraulic tilt jacks 26 for selectively changing the attitude of the bucket 21, suitable detailed structure for such mechanism being known in the art.

The front and rear frames 12 and 14 respectively are coupled together by a kingpin hitch 27 which provides for pivoting of one frame relative to the other about a vertical axis, by means of steering jacks 28, for the purpose of steering the vehicle. The operator's station 29 may include a closed cab 31 and is situated on the upper forward portion of the rear frame 14 preferably at the pivot axis of hitch 27. This position of the operator's station 29 allows the operator to view the bucket 21 and the area immediately ahead of the vehicle.

Considering the rollover safety structure 32 for safeguarding the operator in the event the loader should overturn, a post member 33 extends upwardly and slightly rearwardly from each loader tower 18 of the front frame 12. Post members 33 are of sufficient strength to support the weight of the loader vehicle 11 and are attached to the upper ends of loader towers 18 by high strength fastening means such as bolts 34. The pivot axles 22 which attach the lift arms to the loader tower are extended through the post members 33 to further strengthen the attachment. The protective structure 32 is completed by a rectangular member 36 extending between the tops of post members 33 and supported thereby and extending rearwardly above the operator's station 29 on back frame 14. In this example of the invention, the rectangular top member 36 and posts 33 are fabricated as an integral unit but it will be apparent that essentially the same construction can be assembled from separate members attached together by suitable fasteners.

Should the loader 11 overturn in operation, the operator is safeguarded by the rollover safety structure 32. The mounting of the rollover safety structure 32 on the loader towers 18 of the front frame 12 is particularly advantageous in that the towers are designed to withstand the high load forces generated by bucket manipulations and are also situated adjacent the front of operator's station 29 whereby the protective structure may be of relatively small bulk and complexity. As best illustrated in FIG. 3, the spaced post members 33 define a window 35 through which the operator may view the bucket 21 and the direction of travel of the vehicle and this view area is not affected by turning of the vehicle as the posts 33 turn with the front frame 12. If desired, as shown in FIG. 1, suitable openings 37 may be provided in the posts 33 to minimize interference with the operator's view of the regions at each side of the bucket and direction of travel.

It will be apparent that variations in the described structure are possible and is not intended to limit the invention except as defined in the following claims.

What I claim is:

1. Rollover safety structure for an articulated loader vehicle having a rear frame carrying an operator's station and a front frame supporting a bucket for carrying material wherein said front and rear frames are joined by means providing for forced relative pivoting therebetween about a vertical axis to steer said vehicle, said rollover structure comprising:

a pair of spaced-apart post members each having a base secured to one side of said front frame and extending in a substantially upward direction therefrom, and a top member extending between said pair of post members and extending rearwardly therefrom over said operator's station of said rear frame.

2. The combination defined in claim 1 wherein said front frame of said articulated loader vehicle has a pair of upwardly extending loader tower members disposed one at each side of said frame for supporting said bucket and wherein said bucket is fastened to said front frame by a pair of lift arms coupled to the upper ends of said loader towers by pivot axles, wherein each of said post members is secured to the upper end of a separate one of said loader towers.

3. The combination defined in claim 2 wherein said pivot axles which couple said lift arms to said loader towers extend through the associated one of said post members to strengthen the fastening of said post members to said loader towers.

4. The combination defined in claim 1 wherein said post members have openings therein enabling the operator to view regions forwardly and sidewardly of said bucket through said post members.

5. The combination defined in claim 1 wherein said operator's station is situated substantially above said vertical pivot axis between said front and rear frames and wherein said top member of said rollover protective structure extends above said pivot axis whereby said top member remains above said operator's station irrespective of angling of said front frame relative to said back frame.

6. A rollover safety structure for attachment to an articulated loader which has a rear frame supporting an operator's station and a front frame which may be pivoted relative to the rear frame and which carries a pair of spaced-apart loader towers for supporting a bucket, comprising a pair of spaced-apart parallel post members each having means at the base thereof for attachment to a separate one of said loader towers to support said safety structure thereon with said post members extending upwardly from said loader towers when attached thereon, and a top member extending between said post members and being angled with respect thereto to extend back over said operator's station of said rear frame when said safety structure is attached to said front frame.